United States Patent [19]
Dommer et al.

[11] Patent Number: 4,944,626
[45] Date of Patent: Jul. 31, 1990

[54] APPARATUS HAVING TWO ADJUSTABLE SLIDE SUPPORTS WHICH HAVE ATTACHMENT SURFACES FOR ATTACHING TWO HOLDING DEVICES

[76] Inventors: Armin Dommer, Eichweg 13; Dieter Dommer, Bahnhofstr. 5, both of, 7257 Ditzingen 1, Fed. Rep. of Germany

[21] Appl. No.: 304,059

[22] Filed: Jan. 30, 1989

[30] Foreign Application Priority Data

Jan. 29, 1988 [DE] Fed. Rep. of Germany ....... 3802663

[51] Int. Cl.$^5$ .............................................. F16D 1/00
[52] U.S. Cl. ........................................ 403/3; 403/380; 403/410; 403/370; 403/4
[58] Field of Search ....................... 403/3, 4, 370, 380, 403/410

[56] References Cited

FOREIGN PATENT DOCUMENTS 2734911 2/1979 Fed. Rep. of Germany .
8207270 8/1982 Fed. Rep. of Germany .

Primary Examiner—Andrew V. Kundrat
Assistant Examiner—Carol I. Bordas
Attorney, Agent, or Firm—Douglas H. Pauley; Thomas W. Speckman

[57] ABSTRACT

An apparatus having two slide supports, adjustable with respect to one another, which have attachment surfaces for attaching two holding devices. The balance of the holding devices attached to the attachment surfaces of the slide supports are compensated by having the slide supports each divided into a slide support base plate and an attachment plate with the attachment surface. The attachment plates are connected in a limited adjustable manner with the slide support base plates under spring tension using spring-stressed bolts oriented perpendicular relative to the attachment surfaces. The attachment plate of the first slide support is adjustable in a limited manner through use of an adjustment bolt oriented perpendicular relative to the direction of adjustment of the slide supports on the coordinated slide support base plate. The attachment plate of the second slide support is adjustable in a limited manner relative to the respective slide support base plate through use of an adjustment bolt oriented perpendicular relative to the attachment surface.

15 Claims, 2 Drawing Sheets

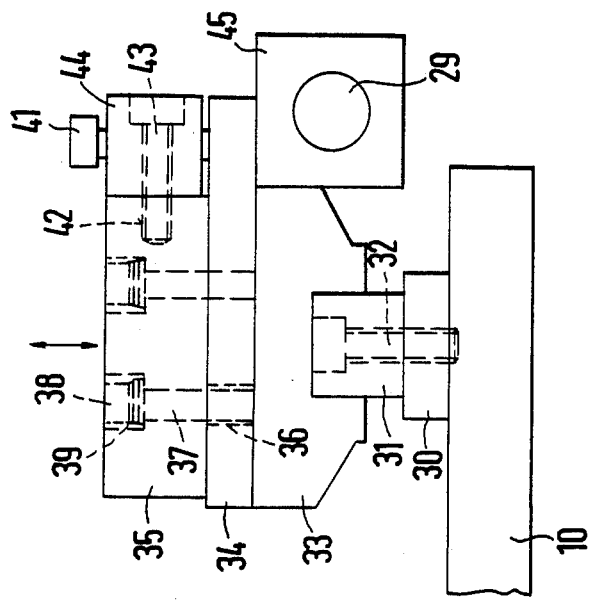
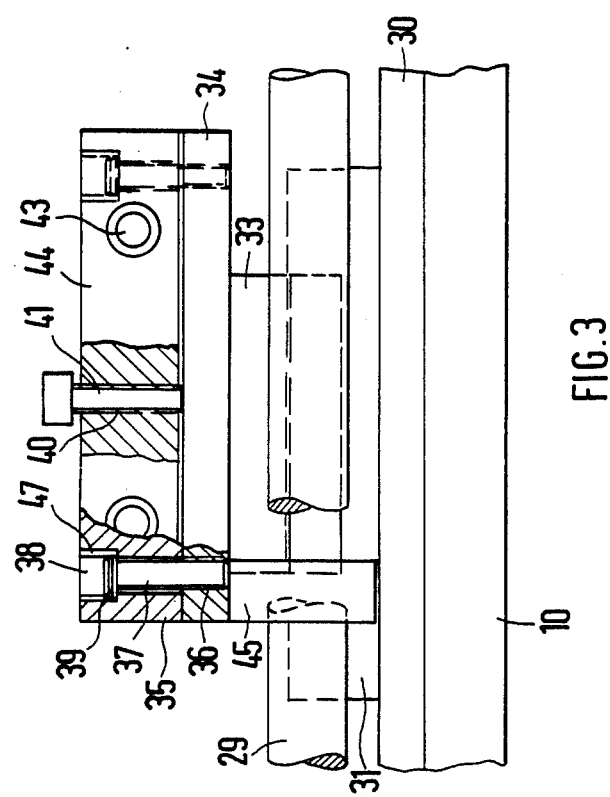

APPARATUS HAVING TWO ADJUSTABLE SLIDE SUPPORTS WHICH HAVE ATTACHMENT SURFACES FOR ATTACHING TWO HOLDING DEVICES

BACKGROUND OF THE INVENTION

1. Field of the Invention

This invention relates to an apparatus having two slide supports, at least one of the slide supports is moveable relative to the other and both slide supports have an attachment plate with an attachment surface for securing a holding device in a fixed position on the attachment plate.

2. Description of the Prior Art

Such types of apparatuses are used, for example, to secure two plastic pipe sections or plastic form pieces having their central axes aligned, into holding devices. The front sides opposing one another can then be face milled and after plastic deformation, can be bonded flushly with one another. Thus both slide supports can be adjusted against one another. The direction of adjustment is parallel to the central axes of the plastic pipe sections or the plastic form pieces which are secured in the holding devices. It is sufficient if one slide support is firmly fixed or secured and the other slide support is mounted in an adjustable manner.

SUMMARY OF THE INVENTION

It is known that in holding devices which are mounted to the attachment surfaces of slide supports have specific tolerances so that plastic pipe sections or plastic form pieces, in the fixed or secured condition, are not precisely aligned with their central axes. This adversely affects the quality of the secured connection. Since every diameter of the plastic pipe sections or plastic form pieces requires a custom designed holding device, it is not possible to adjust the holding devices and it is also unjustified from the standpoint of materials costs.

It is one object of this invention to provide an apparatus of the type stated above, without increasing the relative costs of the holding apparatus, capable of rapidly and easily aligning the central axes of the profile sections fixed in the holding apparatuses.

In one embodiment according to this invention, the slide supports are each divided into a slide support base plate and an attachment plate having an attachment surface. The attachment plates are connected with the slide support base plates under spring tension, in a limited adjustable manner, by means of spring tension directed perpendicular to the attachment surface. The attachment plate of the first slide support is adjustable in a limited manner on the coordinated slide support base plate by means of an adjustment bolt positioned perpendicular to the direction of adjustment of the slide support. The attachment plate of the second slide support is adjustable in a limited manner by means of an adjustment bolt positioned perpendicular to the attachment surface, relative to the coordinated slide support base plate.

The attachment plates which are kept under tension with the spring-stressed bolts can be simply adjusted to align the holding apparatuses which are connected with the attachment surfaces. The attachment plate of the first slide support permits a horizontal balancing adjustment while the attachment plate of the second slide support permits vertical balancing adjustment. For such purpose, each slide support can also be divided into a slide support base plate and an attachment plate, and connected with one another by means of spring-stressed bolts. Furthermore, only one adjustment bolt per slide support is necessary.

In another embodiment of this invention, the slide support base plate of the first slide support is solidly connected with a base plate. The slide support base plate of the second slide support is adjustable by means of a slide support guide block positioned on a guide rail of the base plate. Thus only the second slide support need be adjustable while the first slide support can be stationary.

The costs for an apparatus according to this invention are kept low by having the slide support base plate of the first slide support integrally formed in a single piece on the base plate. The slide support base plate of the second slide support is constructed in a single piece with the slide support guide block. The guide rail is attached to an attachment rail which is integrally formed with or attached to the base plate.

According to one embodiment of this invention, the first slide support is adjusted by having an attachment block, which extends into the area of the coordinated attachment plate, attached in the area of the front side of the slide support base plate of the first slide support. In the upper side of the attachment block, the adjustment bolt is rotated in an axially non-displaceable but rotatably supported manner within a threaded receptacle of the attachment plate. The adjustment bolt is aligned perpendicular to the direction of adjustment of the slide support. Reception grooves for guide bars which are positioned parallel to the adjustment bolt are inserted into the surfaces of the slide support base plate and the attachment plate of the first slide support, which are oriented to one another. In one embodiment, the adjustment bolt having a bolt head is axially supported and is easily accessible by having the adjustment bolt of the first slide support positioned in a axially non-displaceable manner in a deepened receptacle of a reception groove. The attachment block has a recess in front of the front side of the bolt head of the adjustment bolt.

Adjustment of the attachment plate of the second slide support is accomplished by having the attachment plate of the second slide support connected to the coordinated slide support base plate with four spring-stressed bolts arranged in a square or rectangular pattern. The attachment plate has a threaded bore oriented perpendicular to the attachment plate. The adjustment bolt of the second slide support is mateable within the threaded bore and is supported on the surface of the slide support base plate, oriented toward the attachment plate.

An attachment bar is threadedly attached in the area of the forward side of the attachment plate of the second slide support. The threaded boring for the adjustment bolt is inserted into such attachment bar so that the attachment plate can be produced from a light material, such as aluminum.

The connection between the attachment plate and the slide support base plate of the first slide support, which is adjustable in a limited manner under spring tension, is accomplished by having bolts with bolt heads for attaching the slide support base plate with the attachment plate of the first slide support. The bolt heads are supported on the lower side of the base plate through interposition of disk springs in expanded receptacles of a boring. The bolts are mateable within aligning bores in the slide support base plate and are mateable within aligning threaded receptacles of the attachment plate.

The connection between the attachment plate and the slide support base plate of the second slide support is adjustable in a limited manner, under spring tension. For connection of the attachment plate with the slide support base plate of the second slide support, the bolts have a bolt head. The bolt heads are supported through interposition of disk springs in expanded receptacles on the side of the attachment surface of the attachment plate. The bolts are mateable within borings of the attachment plate and are mateable within aligning threaded receptacles of the slide support base plate.

For adjustment of the second slide support, a guide block is attached on the forward side of the slide support base plate or the slide support guide block of the second slide support. The guide block accommodates, in a displaceable manner, a guide shaft positioned parallel to the direction of adjustment of the slide supports. The opposite end of the guide shaft is fixed with a clamping device in an aligning bore of the attachment block of the first slide support.

BRIEF DESCRIPTION OF THE DRAWINGS

This invention is illustrated in further detail by means of one embodiment shown in the drawings where:

FIG. 3 is a front view of the second adjustable slide support of the apparatus; and FIG. 4 is a side view of the second slide support as shown in FIG. 3.

DESCRIPTION OF THE PREFERRED EMBODIMENTS

Figure 1:
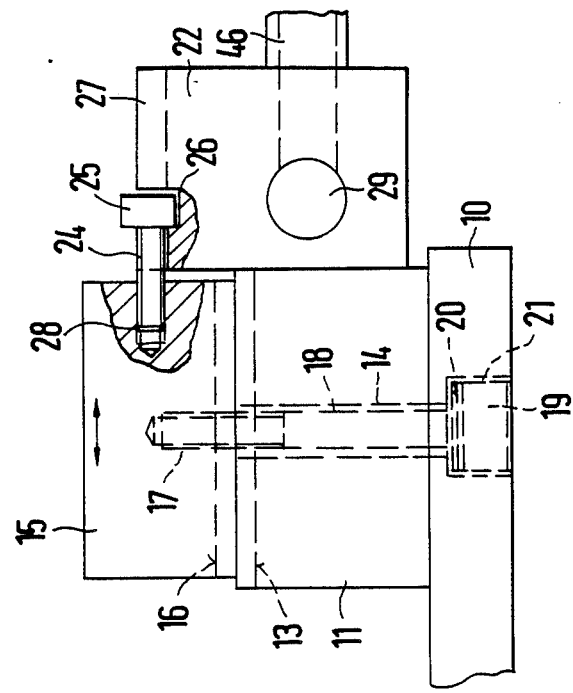
FIG. 1 is a front view of the first stationary slide support of the apparatus.
Figure 2:
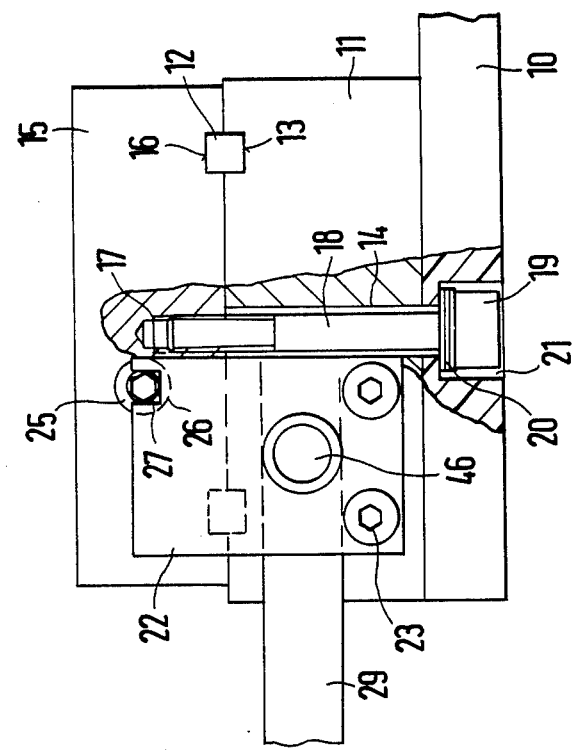
FIG. 2 is a side view of the first slide support as shown in FIG. 1.

According to one embodiment of this invention, the entire apparatus is attached to a base plate (10). The first stationary slide support as shown in FIGS. 1 and 2 is an attachment plate (15). The slide support base plate (11) can be a part separate from the base plate (10) or it can be integrally formed as a single piece. An enlarged receptacle (21) of the bore, which accommodates the bolt head (19) and the disk springs (20) positioned on the bolt (18), is inserted within the lower side of the base plate (10) with the bolt (18). The slide support base plate (11) has borings (14) aligned with the borings of the base plate (10) through which the bolts (18) are conducted, and are mateable within aligning threaded receptacles (17) of the attachment plate (15). One bolt (18) is sufficient to connect the attachment plate (15) under spring tension in a limited adjustable manner with respect to the slide support base plate (11).

In the contacting area of the surfaces of the slide support base plate (11) and attachment plate (15), reception grooves (13 and 16), for the guide bars (12), are aligned relative to one another and are oriented perpendicular to the direction of adjustment of the second slide support, as shown in FIGS. 3 and 4. Thus, each reception groove (13 and 16) has a cross-section which corresponds to half the cross-section of the guide bars (12). The guide bars (12) can be mounted within the reception grooves (13) of the slide support base plate (11). The attachment plate (15) is thereby adjustable in a limited manner on the slide support base plate (11), perpendicular to the direction of the adjustment of the slide supports thus providing a horizontal compensation balance for the holding apparatus secured to the attachment plate (15).

The first of two holding profile sections is attachment block (22) that is attached on the forward side of the slide support base plate (11) with the attachment bolts (23). The attachment block (22) clamps the guide shaft (29) which is mounted within the bore with means (46) for clamping the guide shaft (29). The guide shaft (29) leads to the second slide support which is adjustably positioned on the guide shaft (29). In this embodiment, the guide shaft (29) may be plastic pipe sections or any other guide shaft pieces having their central axes to be aligned. The attachment block (22) projects into the area of the attachment plate (15) and in its upper side has a deepened receptacle (26) in a reception groove for the adjustment bolt (24). The deepened receptacle (26) accommodates the bolt head (25) of the adjustment bolt (24) so that it is mounted in an axially non-displaceable but rotatable position on the attachment block (22). The recess (27) is positioned in front of the front side of the bolt head (25) so that a tool reception within the front side of the bolt head (25) is easily accessible. The adjustment bolt (24) is mateable within the threaded bore (28) of the attachment plate (15). Thus, rotating the adjustment bolt (25) one direction or the other displaces attachment block (22) away from the attachment plate (15) or toward the attachment plate (15), as the double arrow indicates.

Referring to FIGS. 3 and 4, on the upper side in the adjustment area of the second adjustable slide support, the base plate (10) supports the attachment rail (30) and the guide rail (31), which is attached to the attachment rail with the bolt (32). The attachment rail (30) can also be integrally formed in a single piece with the base plate (10). The attachment rail (30) and the guide rail (31) extend over the maximum adjustment path of the second adjustable slide support, as shown in FIGS. 3 and 4. The second slide support comprises the slide support base plate (34) and the attachment plate (35). The slide support base plate (34) can be connected with the slide support guide block (33) or can be integrally formed in a single piece with the same. The bolts (37) connect the attachment plate (35) under spring tension, in a limited adjustable manner, with the slide support base plate (34). In a preferred embodiment of this invention, four bolts (37) arranged in a rectangular pattern can be used to connect the attachment plate (35). The bolt heads (38) with the disk springs (39) are mounted in relatively enlarged receptacles (47) in the attachment surface of the attachment plate (35) and are mateable within the threaded receptacles (36) of the slide support base plate (34). The bolts (37) are oriented perpendicular to the attachment surface of the attachment plate (35). On the front side of the attachment plate (35), the attachment bar (44) has a threaded bore (40) oriented perpendicular to the attachment surface which is attached with bolts (43). The adjustment bolt (41) is supported with the front side on the surface of the slide support base plate (34) which is turned toward the attachment plate (35). The adjustment bolt (41) is mateable within the threaded bore (40). By rotating the adjustment screw (41) in one direction or the other, the attachment plate (35) is displaced either away from or toward the slide support base plate (34). The disk springs (39) always force the bolt (41) against the slide support base plate (34) and clamp the adjusted position of the attachment plate (35). The holding device connected with the attachment surface of the attachment plate (35) can be adjusted vertically with the adjustment screw (41) so that, in connection with the horizontal adjustment of the attachment plate (35) of the first stationary slide support, an absolute and simple alignment of the central axes of the profile sections fixed in the tightening devices is possible. The slide support guide block (33) encompasses the guide rail (31) to ensure a non-deflected adjustment of the second slide support.

The second of two profile sections is guide block (45) which has a bore for the guide shaft (29) is attached to the front of the slide support guide block (33). The adjustable second slide support is mounted in an adjustable manner on the guide shaft (29) thereby adding guidance of the slide support guide block (33) on the guide rail (31).

We claim:

1. An apparatus having two slide supports, adjustable with respect to one another, the slide supports each have an attachment surface for attaching two holding devices, the apparatus further comprising:
   the slide supports each comprising a slide support base plate (11,34) and an attachment plate (15,35) having the attachment surfaces;
   said attachment plate (15,35) connected with spring tension in an adjustable manner relative to said slide support base plate (11,34) with spring-stressed bolts (18,37) oriented perpendicular to the attachment surfaces;
   said attachment plate (15) of a first slide support of the slide supports perpendicularly adjustable relative to a direction of adjustment of the slide supports on a first slide support base plate (11); and
   said attachment plate (35) of a second slide support of the slide supports perpendicularly adjustable relative to the attachment surface of a second slide support base plate (34)";"
   an attachment block (22) attached in a first area of a front side of said first slide support base plate (11) of said first slide support, said attachment block (22) extending into a second area of said attachment plate (15);
   in an upper side of said attachment block (22) a first adjustment bolt (24) mounted in an axially non-displaceable but rotatable manner and mateable within a receptacle (28) of said attachment plate (15), and first adjustment bolt (24) oriented perpendicular relative to a sliding direction of adjustment of said slide supports; and
   said first slide support base plate (11) and said attachment plate (15) of said first slide support having reception grooves (13, 16) for guide bars (12) and said guide bars (12) positioned parallel to said first adjustment bolt (24).—;

2. An apparatus according to claim 1, wherein said first slide support base plate (11) of said first slide support is secured to a base plate (10) and said second slide support base plate (34) of said second slide support is adjustably mounted with a slide guide block (33) on a guide rail (31) of said base plate (10).

3. An apparatus according to claim 2, wherein said first slide support base plate (11) of said first slide support is integrally formed in a single piece with said base plate (10).

4. An apparatus according to claim 3 wherein said second slide support base plate (34) of said second slide support further comprises a single piece with said slide support guide block (33) and said guide rail (31) is attached to an attachment rail (30) which is secured to said base plate (10).

5. An apparatus according to claim 4, wherein said first adjustment bolt (24) of said first slide support is mounted in an axially non-displaceable manner in a receptacle (26) with a bolt head (25) and said attachment block (22) has a recess (27) in front of said bolt head (25) of said first adjustment bolt (24).

6. An apparatus according to claim 5 wherein said attachment plate (35) of said second slide support is connected with said second slide support base plate (34) with four spring-stressed bolts (37) arranged in a rectangular pattern; and
   said attachment plate (35) has a threaded bore (40) aligned perpendicular relative to said attachment plate (35), a second adjustment bolt (41) of said second slide support is mateable within said threaded bore (40) and is supported on a surface of said second slide support base plate (34) which is oriented toward said attachment plate (35).

7. An apparatus according to claim 6 wherein an attachment bar (44) is mounted on a front side of said attachment plate (35) of said second slide support and said attachment bar (44) has said threaded bore (40) mateable with said second adjustment bolt (41).

8. An apparatus according to claim 7 further comprising: first bolts (18) having first bolt heads (19) for connecting said first slide support base plate (11) with said attachment plate (15) of said first slide support, said first bolt heads (19) through interposition of disk springs (20) mounted within receptacles (21) on a lower side of said base plate (10), and said first bolts (18) mateable within aligning bores (14) in said first slide support base plate (11) and mateable within aligning threaded receptacles (17) of said attachment plate (15).

9. An apparatus according to claim 8 further comprising: second bolts (37) each having a second bolt head (38) for connecting said attachment plate (35) with said second slide support base plate (34) of said second slide support, said second bolt heads (38) through interposition of disk springs (39) each mounted within a receptacle (47) and supported on a side of said attachment surface of said attachment plate (35), and said second bolts (37) each mateable within a bore of said attachment plate (35) and mateable within an aligning threaded receptacle (36) of said second slide support base plate (34).

10. An apparatus according to claim 9 further comprising: a guide block (45) attached on a front side of at least one of said second slide support base plate (34) and a slide support guide block (33) of said second slide support, said guide block (45) attached in a displaceable manner and accommodating a guide shaft (29) oriented parallel to a direction of adjustment of said slide supports, and an opposite end of said guide shaft (29) fixed in an aligning bore of said attachment block (22) of said first slide support with means (46) for clamping.

11. An apparatus according to claim 1, wherein said first adjustment bolt (24) of said first slide support is mounted in an axially non-displaceable manner in a receptacle (26) with a bolt head (25) and said attachment block (22) has a recess (27) in front of said bolt head (25) of said first adjustment bolt (24).

12. An apparatus according to claim 1, wherein said attachment plate (35) of said second slide support is connected with said second slide support base plate (34)

with four spring-stressed bolts (37) arranged in a rectangular pattern; and said attachment plate (35) has a threaded bore (40) aligned perpendicular relative to said attachment plate (35), an adjustment bolt (41) of said second slide support is mateable within said threaded bore (40) and is supported on a surface of said slide support base plate (34) which is oriented toward said attachment plate (35).

13. An apparatus according to claim 1 further comprising: bolts (18) having bolt heads (19) for connecting said first slide support base plate (11) with said attachment plate (15) of said first slide support, said bolt heads (19) through interposition of disk springs (20) mounted within receptacles (21) on a lower side of said base plate (10), and said bolts (18) mateable within aligning bores (14) in said first slide support base plate (11) and mateable within aligning threaded receptacles (17) of said attachment plate (15).

14. An apparatus according to claim 1 further comprising: bolts (37) each having a bolt head (38) for connecting said attachment plate (35) with said second slide support base plate (34) of said second slide support, said bolt heads (38) through interposition of disk springs (39) each mounted within a receptacle (47) and supported on a side of said attachment surface of said attachment plate (35), and said bolts (37) each mateable within a bore of said attachment plate (35) and mateable within an aligning threaded receptacle (36) of said second slide support base plate (34).

15. An apparatus according to claim 1, further comprising: a guide block (45) attached on a front side of at least one of said second slide support base plate (34) and a slide support guide block (33) of said second slide support, said guide block (45) attached in a displaceable manner and accommodating a guide shaft (29) oriented parallel to a direction of adjustment of said slide supports, and an opposite end of said guide shaft (29) fixed in an aligning bore of said attachment block (22) of said first slide support with means (46) for clamping.

* * * * *